United States Patent
LeCrone et al.

(10) Patent No.: US 10,466,918 B1
(45) Date of Patent: Nov. 5, 2019

(54) LARGE SIZE FIXED BLOCK ARCHITECTURE DEVICE SUPPORT OVER FICON CHANNEL CONNECTIONS

(71) Applicant: EMC IP Holding Company LLC, Hopkinton, MA (US)

(72) Inventors: Douglas E. LeCrone, Hopkinton, MA (US); Martin J. Feeney, Medway, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 411 days.

(21) Appl. No.: 14/228,945

(22) Filed: Mar. 28, 2014

(51) Int. Cl.
*G06F 3/06* (2006.01)

(52) U.S. Cl.
CPC .......... *G06F 3/0629* (2013.01); *G06F 3/0604* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 3,976,976 A * | 8/1976 | Khosharian | ............... | G06F 9/32 711/2 |
| 5,579,503 A * | 11/1996 | Osborne | ............. | G06F 12/0813 709/234 |
| 7,702,762 B1 * | 4/2010 | Jagana | ................ | H04L 67/1097 370/466 |
| 2004/0068635 A1 * | 4/2004 | Bjork | ................. | G11B 20/1251 711/171 |
| 2005/0102682 A1 * | 5/2005 | Shah | ..................... | G06F 13/387 719/321 |
| 2011/0153715 A1 * | 6/2011 | Oshins | .................. | G06F 9/5088 709/203 |
| 2012/0265967 A1 * | 10/2012 | Gschwind | ........... | G06F 9/30138 712/210 |

OTHER PUBLICATIONS

Schmid, Patrick and Roos, Achim. "Hitachi's 4 TB Hard Drives Take on the 3 TB Competition". Tom's Hardware. Published Apr. 24, 2012. <http://www.tomshardware.com/print/4tb-3tb-hdd,reviews-3183.html>.*

Waldspurger, Carl and Rosenblum, Mendel. "I/O Virtualization". ACM. Published Jan. 2012.*

Rogers, Paul. z/OS Version 1, Release 11 Implementation. IBM International Technical Support Organization. "High Performance FICON for z". p. 425-440. 2010. (Year: 2010).*

IBM Corporation, "IBM 3880 Storage Control: Models 1, 2, 3, 4," Description Manual, Pub. No. GA26-1661-9, Tenth Ed., Sep. 1987, 446 pp.

(Continued)

*Primary Examiner* — Charles Rones
*Assistant Examiner* — Hewy H Li
(74) *Attorney, Agent, or Firm* — Muirhead and Saturnelli, LLC (57) ABSTRACT

Systems and procedures are provided to enable large size fixed block architecture (FBA) device support over FICON. The FBA devices may have a size greater than 2 terabytes. For example, in known storage systems, an FBA device size may be 64 terabytes and an architecture provided for 512-terabyte devices, and the described system supports such large, or even larger, FBA devices. The system may be used with existing fixed block command sets.

18 Claims, 6 Drawing Sheets

(56) References Cited

OTHER PUBLICATIONS

U.S. Appl. No. 12/215,984, filed Jun. 8, 2008, LeCrone et al.
U.S. Appl. No. 14/133,852, filed Dec. 19, 2013, Jones et al.
B. Dufrasne et al., "IBM System Storage DS8000: z/Os Distributed Data Backup," IBM Corporation, Redpaper REDP-4701-00, Nov. 16, 2010, 16 pp.
J. Entwistle, "IBM System z10 FICON Express8 FCP Channel Performance Report," IBM Corporation, Technical paper, Aug. 2009, 27 pp.
C. Cronin, "IBM System z10 I/O and High Performance FICON for System z Channel Performance," IBM Corporation, Technical paper, Jan. 28, 2009, 33 pp.

\* cited by examiner

LARGE SIZE FIXED BLOCK ARCHITECTURE DEVICE SUPPORT OVER FICON CHANNEL CONNECTIONS

TECHNICAL FIELD

This application relates to the field of computer systems and, more particularly, to device access and connections among computing systems.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Mainframe computers are large scale computer system architectures that are used by large organizations for bulk data processing, such as financial transaction processing. Mainframe computers offer enhanced availability, scalability, reliability and security along with high volume data throughput, among other features. Input/Output (I/O) devices may be coupled to interact with mainframe computers that may include an I/O subsystem that communicates with the I/O devices over communication channels. The I/O subsystem controls data flow between I/O devices and main storage. The I/O subsystem may be coupled to the central processors of the main system and may communicate directly with the I/O devices. The I/O subsystem may communicate with the I/O devices using multiple types of interfaces, including, for example, communication channels such as Fibre channels. For example, IBM Corporation's System z® is a mainframe platform and computing environment that is widely used in the industry and that includes z/Architecture-based systems and zSeries mainframes. System z components may operate with IBM's z/OS® (operating system) and/or other zSeries-compatible operating systems.

Fixed block architecture (FBA) is a disk layout in which each addressable block on disk is of the same size. In an FBA system, data (logical volumes) are mapped over the fixed-size blocks and a disk drive stores the data in the blocks of fixed size. Specifically, the FBA architecture has two characteristics: each physical block is the same size and each physical block is individually addressable by a value called the logical block address (LBA). In some cases, an FBA device may be characterized by tracks and cylinders and in which the physical disk may contain multiple blocks per track, and the cylinder may be the group of tracks that exists under the disk heads at one point in time without performing a seek operation. For further discussion of storage control using FBA, an/or other formats, to provide high-speed direct access storage for general purpose data storage and system residence, reference is made, for example, to IBM Corporation, "IBM 3880 Storage Control: Models 1, 2, 3, 4," Description Manual, Pub. No. GA26-1661-9, Tenth Ed., September 1987, 446 pp., which is incorporated herein by reference.

Hosts may address FBA devices over a number of channel connections, including Fibre channel connections. For example, in a conventional system, a host may include an operating system and a Fibre Channel connection portion, which includes hardware and/or software for facilitating a FICON data connection between the host and a conventional data storage device. FICON (Fibre Connection) operates on a Fibre Channel protocol from IBM Corporation and may be used in connection with implementing Fibre channel connections to provide high-speed connectivity between a channel and a device and allows multiple data exchanges in full duplex mode. FICON is compatible with z/Architecture computing systems in connection with I/O devices performing I/O processing therewith. For a discussion of features and implementations of FICON systems and suitable Fibre channel protocols operating therewith on z/Architecture computing systems, reference is made to J. Entwistle, "IBM System z10 FICON Express8 FCP Channel Performance Report," Technical paper, Aug. 2009, 27 pp., which is incorporated herein by reference.

One known system that enables FICON device access of FBA storage devices is IBM Corporation's z/OS Distributed Data Backup (zDDB) system as implemented in IBM's DS8000® product, and reference is made, for example, to B. Dufrasne et al., "IBM System Storage DS8000: z/OS Distributed Data Backup," IBM Corporation, Redpaper REDP-4701-00, Nov. 16, 2010, 16 pp., which is incorporated herein by reference. However, with this system, there is an architectural storage device size limit of two (2) terabytes (TB). Specifically, for a 512-byte block (9 bits) and a 4 byte LBA offset, only 2 TB (32 bits plus 9 bits=41 bits or 2 TB) of a FICON-connected device may be accessed.

Accordingly, it would be desirable to provide improved software and hardware that eliminates or reduces the issues noted above, such as by enabling large FBA device support over FICON connections.

SUMMARY OF THE INVENTION

According to the system described herein, a method is presented for providing storage device access. The method includes using a fixed block command set of a fixed block architecture (FBA) to access at least one storage device using a FICON communication channel of a storage system, wherein the at least one storage device has a size larger than 2 terabytes. A controller of the communication channel is configured to access an extended field of information that provides accessibility to the at least one storage device, having the size larger than 2 terabytes, using the fixed block command set, such as the IBM 3880 fixed block command set described, for example, in Chapter 3: Fixed Block Command Set of "IBM 3880 Storage Control: Models 1, 2, 3, 4," which is cited elsewhere herein. The storage system may include z/Architecture components. The storage device may have a size equal to or larger than 64 terabytes, and may further be sized between 512 terabytes and 144 petabytes. The fixed block command set may support 3880/3370-type operations. The controller and the storage device may operate in a virtualized environment.

According further to the system described herein, a non-transitory computer-readable medium stores software for providing storage device access. The software includes executable code that recognizes a fixed block command set of a fixed block architecture (FBA) to access a storage device using a FICON communication channel, wherein the storage device has a size larger than 2 terabytes. Executable code is provided that enables a controller of the communication channel to access an extended field of information that provides accessibility to the storage device, having the size larger than 2 terabytes, using the fixed block command set. The storage system may include z/Architecture components. The storage device may have a size equal to or larger than 64 terabytes, and may further be sized between 512 terabytes and 144 petabytes. The fixed block command set may support 3880/3370-type operations. The controller and the storage device may operate in a virtualized environment.

According further to the system described herein, a storage system is provided having a host having an operating system and a FICON controller, at least one storage device, and a FICON connection between the host and the at least one storage device. A non-transitory computer-readable medium stores software for providing storage device access. The software includes executable code that recognizes a fixed block command set of a fixed block architecture (FBA) to access a storage device using a communication channel, wherein the storage device has a size larger than 2 terabytes. Executable code is provided that enables a controller of the communication channel to access an extended field of information that provides accessibility to the storage device, having the size larger than 2 terabytes, using the fixed block command set. The storage system may include z/Architecture components. The storage device may have a size equal to or larger than 64 terabytes, and may further be sized between 512 terabytes and 144 petabytes. The fixed block command set may support 3880/3370-type operations. The controller and the storage device may operate in a virtualized environment.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
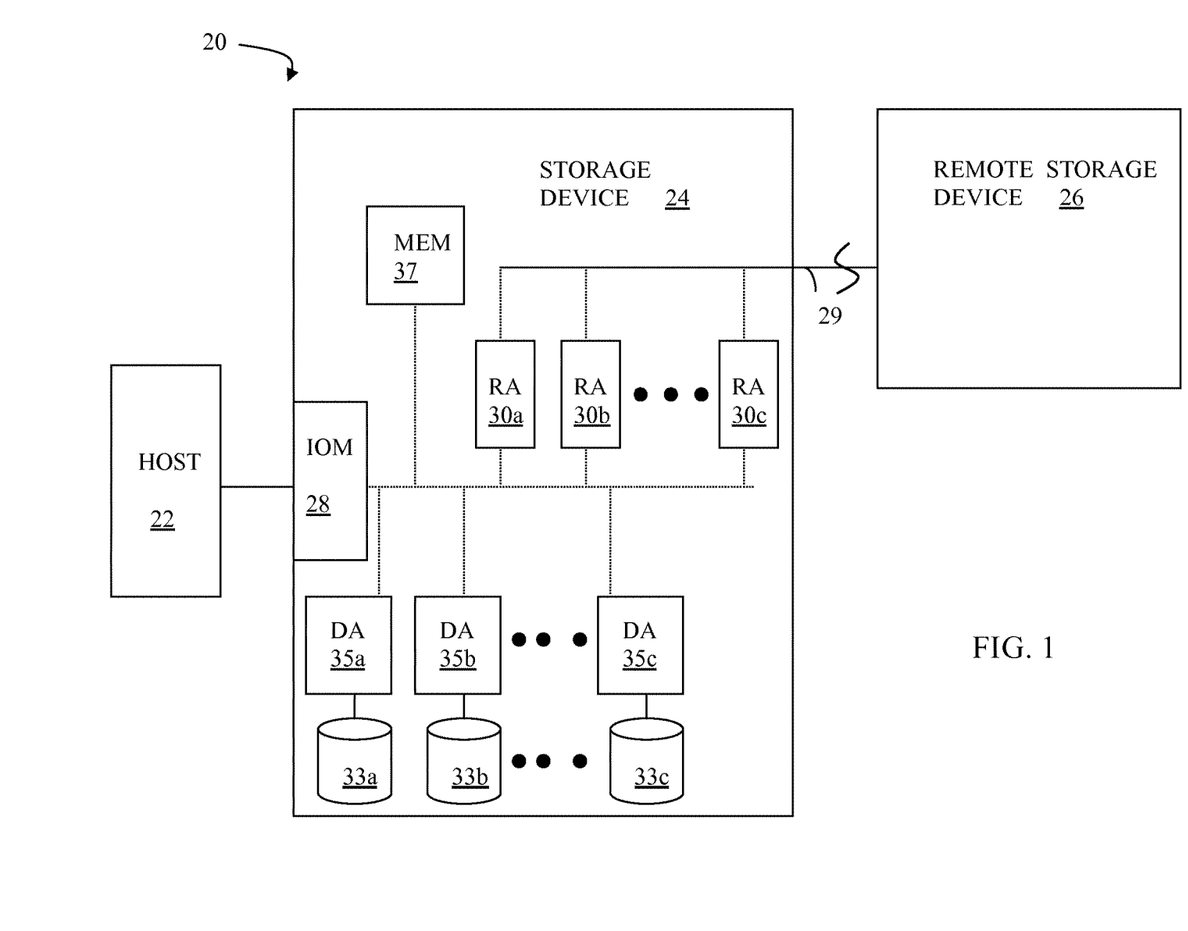
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix storage system produced by EMC Corporation of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an I/O module (IOM) 28, which facilitates the interface between the host 22 and the storage device 24. Although the diagram 20 only shows one host 22 and one IOM 28, it will be appreciated by one of ordinary skill in the art that multiple IOM's may be used and that one or more IOM's may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process, that causes the data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of adapter units (RA's) 30a, 30b, 30c. The RA's 30a-30c may be coupled to the link 29 and be similar to the I/O Module 28, but are used to transfer data between the storage devices 24, 26.

The storage device 24 may include one or more disks, each containing a different portion of data stored on each of the storage device 24. FIG. 1 shows the storage device 24 including a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the IOM 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the IOM 28 and the RA's 30a-30c. The memory 37 may contain tasks that are to be performed by one or more of the DA's 35a-35c, the IOM 28 and the RA's 30a-30c, and a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b.

Similarly, the storage space for the remote storage device 26 that comprises the disks 34a-34c may be subdivided into a plurality of volumes or logical devices, where each of the logical devices may or may not correspond to one or more of the disks 34a 34c.

Figure 2:
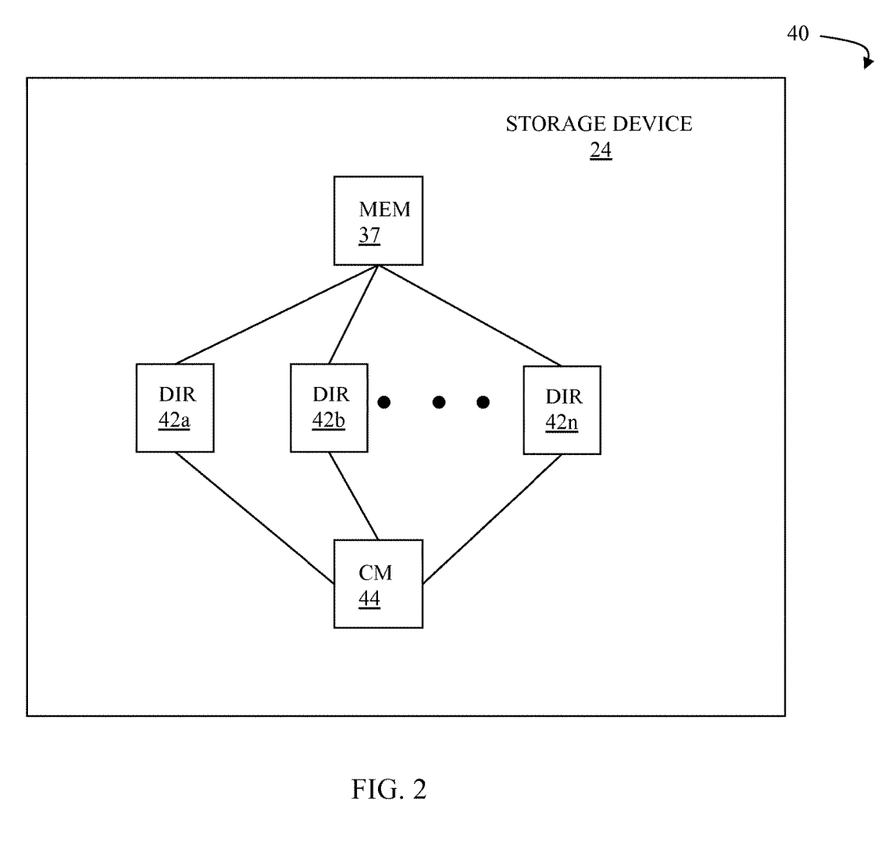
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the IOM 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an IOM and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

According to the system described herein, systems and procedures are provided to enable large FBA device support over FICON connections, in particular for FBA devices having a size greater than 2 TB. For example, in known volume group (VG) storage systems, the FBA device size may be 64 TB and the architecture is for 512 TB. The system described herein is principally discussed in connection with FBA block sizes of 512 bytes, which is a standardized value. As discussed herein, under known systems, 2 TB-sized devices is the maximum supported with a 32-bit LBA and a 512 byte block size. In various embodiments, the system described herein may also be appropriately used in connection with block sizes other than 512 bytes, such as 4096 byte block sizes, and such modification would mean different corresponding device sizes and/or other corresponding values from that presented herein.

For a direct access FBA storage device using 3370 operation, a Read Device Characteristic (RDC) command (command 64) transfers device characteristic information from the storage director to the channel (e.g. up to 32 bytes of information may be transferred). The commands discussed herein include commands from the IBM 3880 fixed block command set described, for example, in Chapter 3: Fixed Block Command Set of "IBM 3880 Storage Control: Models 1, 2, 3, 4," which is cited elsewhere herein.

The RDC command returns the device block count as a 32-bit value in the max_prime_blocks field located at offset 14 (decimal) in the output. The Thirty-two (32) bits are not enough to report the one trillion 512-byte blocks that a 512 TB device supports. In an embodiment, the system described herein provides for logically expanding the max_prime_blocks field to an extended field that will hold additional bits of information, such as a 48 bit field that has least 16 additional bits of information. There are at least 16 unused bits immediately following the max_prime_blocks field at offset 18, which, under current systems, are set to zero (see TABLE 1). The additional bit (16-bit) field, that may referred to herein as max_prime_blocks_ext, may be used to hold additional bits of device information (see TABLE 2) that will enable direct access to a device larger than 2 TB. The host application can easily test this field to determine if this is a large device; a non-zero field value indicates that the device is larger than 2 TB. This approach obviates the need for an explicit "large device" flag and allows existing software to run on devices smaller than 2 TB. The number of blocks the device supports (UINT64 device_size, where UINT64 represents a 64-bit unsigned integer value) may be calculated as (EQ. 1):

$$\text{UINT64 device\_size} = ((\text{UINT64}) \text{max\_prime\_blocks\_ext} << 32 | \text{max\_prime\_blocks} \quad \text{(EQ. 1)}$$

In another embodiment, another option is to redefine the max_prime_blocks field as a true 64-bit value, which would require existing software to be modified to support a 64-bit value. For example, application test suites may provide testing of software and/or hardware systems in connection with mainframe computing platforms and may be used and/or otherwise operated in connection with the system described herein. Such test suites may require modification under this option for the extended device access. One such test suite is the STCMON test suite provided by EMC Corporation of Hopkinton, Mass.

By way of example, TABLE 1 shows known device characteristics formatting in connection with an RDC command of a fixed block command set for a direct access storage device using 3370 operation (see, e.g., Chapter 3: Fixed Block Command Set of "IBM 3880 Storage Control: Models 1, 2, 3, 4," cited elsewhere herein).

TABLE 1

RDC command - known device characteristics format

| Byte | Bits | Description |
|---|---|---|
| 0 | | Operation modes |
| | 0 | Reserved |
| | 1 | Overrunable |
| | 2 | On is burst mode and off is byte mode |
| | 3 | Data chaining allowed |
| | 4-7 | Reserved |
| 1 | | Features |
| | 0 | Reserved |
| | 1 | Removable device |
| | 2 | Shared device |
| | 3 | Reserved |
| | 4 | Movable access mechanism |
| | 5-7 | Reserved |
| 2 | | Device class |
| 3 | | Unit type |
| 4, 5 | | Physical record size |

TABLE 1-continued

RDC command - known device characteristics format

| Byte | Bits | Description |
|---|---|---|
| 6-9 | | Number of blocks per cyclical group |
| 10-13 | | Number of blocks per access position |
| 14-17 | | Number of blocks under movable access mechanism |
| 18-23 | | Reserved - all zeros |
| 24, 25 | | Number of blocks in the CE area |
| 26-31 | | Reserved - all zeroes |

According to an embodiment of the system described herein, TABLE 2 shows device characteristics formatting in connection with an RDC command of a fixed block command set for a direct access storage device using 3370 operation. The system provides for supporting large size FBA device access, such as an FBA device that may, for example, have a size larger than 2 TB, such as 64 TB-512 TB, and provides further expansion to even larger size FBA devices, such as FBA devices having a size of 144 petabytes (PB).

TABLE 2

RDC command-Large size FBA device support characteristics format embodiment

| Byte | Bits | Description |
|---|---|---|
| 0 | | Operation modes |
| | 0 | Reserved |
| | 1 | Overrunable |
| | 2 | On is burst mode and off is byte mode |
| | 3 | Data chaining allowed |
| | 4-7 | Reserved |
| 1 | | Features |
| | 0 | Reserved |
| | 1 | Removable device |
| | 2 | Shared device |
| | 3 | Reserved |
| | 4 | Movable access mechanism |
| | 5-7 | Reserved |
| 2 | | Device class |
| 3 | | Unit type |
| 4, 5 | | Physical record size |
| 6-9 | | Number of blocks per cyclical group |
| 10-13 | | Number of blocks per access position |
| 14-17 | | Number of blocks under movable access mechanism |
| 18-19 | | USED FOR EXTENDED DEVICE ACCESS |
| 20-23 | | POTENTIALLY USED FOR FURTHER EXPANSION |
| 24, 25 | | Number of blocks in the CE area |
| 26-31 | | Reserved - all zeroes |

Additionally, for a direct access FBA storage device using 3370 operation, a Define Extent (DEX) command (command 63) transfers parameters from the channel to the storage directory, the parameters defining the size and location of a data extent (e.g., up to 16 bytes of parameters may be transferred). The DEX command has three 32-bit LBA fields that are used to define the boundary of the blocks to be accessed. The extent_ph_bn field defines the start of the extent as a relative block number from the beginning of the device. As discussed herein, 32-bit LBA value does not adequately address a device that is larger than 2 TB. The DEX command currently has a reserved byte at offset 1 (see TABLE 3; see, e.g., Chapter 3: Fixed Block Command Set of "IBM 3880 Storage Control: Models 1, 2, 3, 4," cited elsewhere herein). The command set defines this parameter to be zero.

By way of example, TABLE 3 shows known device characteristics formatting in connection with a DEX command of a fixed block command set for a direct access storage device using 3370 operation (see, e.g., Chapter 3: Fixed Block Command Set of "IBM 3880 Storage Control: Models 1, 2, 3, 4," cited elsewhere herein):

TABLE 3

DEX command - known parameters format

| Byte | Description |
|---|---|
| 0 | Mask byte |
| 1 | Must be zero |
| 2, 3 | Block size |
| 4-7 | Offset to first block of extent |
| 8-11 | Relative displacement, in data set, to the first block of the extent |
| 12-15 | Relative displacement, in data set, to the last block of the extent |

According to an embodiment of the system described herein, TABLE 4 shows parameter formatting in connection with a DEX command of a fixed block command set for a direct access storage device using 3370 operation that enables large FBA device support. Byte 1 may be used to contain an additional eight bits of LBA addressing information. This field is logically the upper eight bits of a 40-bit block number. It is noted that byte 1 will only be appended to bytes 4-7 (offset to first block of extent). The other two fields 8-11 and 12-15 are relative to the offset (4-7). This scheme will provide addressability for a 512 TB device (assuming 512-byte blocks).

TABLE 4

DEX command-Large size FBA device support parameters format embodiment

| Byte | Description |
|---|---|
| 0 | Mask byte |
| 1 (8 bits) | USED FOR EXTENDED DEVICE ACCESS |
| 2, 3 | Block size |
| 4-7 | Offset to first block of extent |
| 8-11 | Relative displacement, in data set, to the first block of the extent |
| 12-15 | Relative displacement, in data set, to the last block of the extent |

It is noted that, according to the system described herein, in various embodiments, FBA-specific code may be included that accepts count key data (CKD) Define Extent information when used to read a Shared-with-VM FBA device. In such case, where bytes may have different attributes in such devices (e.g., Extended CKD (ECKD) systems uses byte 1 for a global attributes field), code implementation according to the system described herein may be appropriately adjusted to cause the system to behave properly where necessary.

Although the discussion is presented principally in connection with 3370 operation and corresponding command sets, it is noted that the system described herein may be suitably used with other appropriate systems and command sets.

Figure 3:
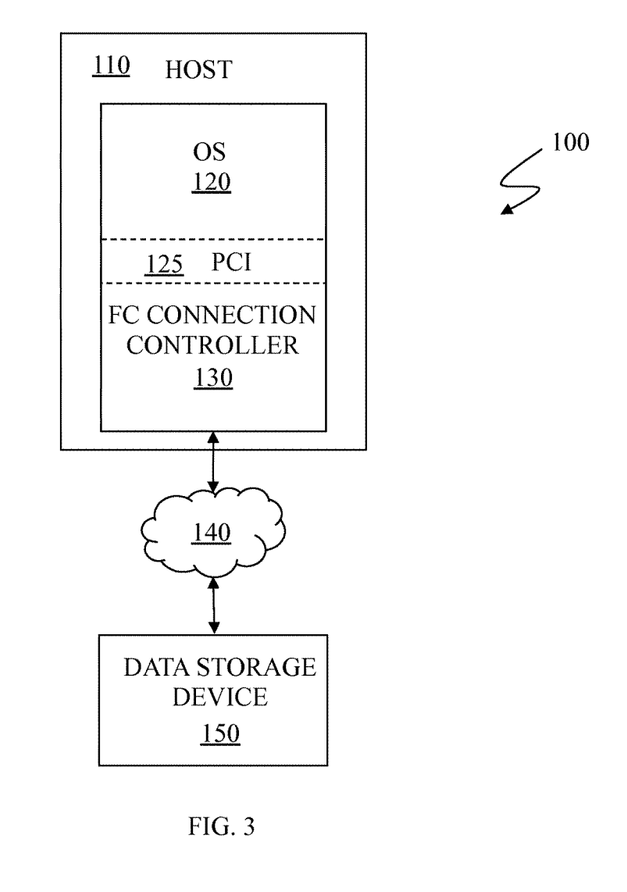
FIG. 3 is a schematic illustration showing a system with a FICON connection between a host and a data storage device that operates to provide large FBA device support according to an embodiment of the system described herein.

FIG. 3 is a schematic illustration showing a system 100 with a FICON connection controller 130 for providing FICON connection between a host 110 and a data storage device 150 and that may operate to provide large size FBA device support according to an embodiment of the system described herein. In an embodiment, the host 110 may be a computer running Linux or some other appropriate operating system 120. In various embodiments, the host 110 may have or be coupled with a Peripheral Component Interconnect (PCI) layer 125 that may provide an interconnection for I/O operations. The I/O processing on the host 110 may operate with the FICON connection controller 130 to enable I/O operations with the data storage device 150. The FICON connection controller 130 may send and receive data to and from the data storage device 140 using a remote connection mechanism 140, that may include a network (such as the Internet, and appropriate connection thereof) and that may, in some circumstances, be done in a way that is transparent (not detectable) by the PCI layer 125. The data storage device 150 may include physical storage volumes and/or logical volumes, such as EMC Corporation's Symmetrix data storage facility. The FICON connection controller 130 may act as an I/O subsystem providing FICON communication capability for the system according to control and formatting features discussed elsewhere herein (see, e.g., TABLES 2 and 4), specifically to enable large size (greater than 2 TB) FBA device access. The data storage device 150 may include features and/or components enabling the Fibre channel communication with the host 110.

It is noted that various components of the system 100 may be emulated, for example, at least a portion of the FICON connection controller may have a portion that emulates the Fibre Channel FC0 physical layer so that the PCI layer 125 sends and receives data as if the PCI layer 125 were connected to a physical Fibre Channel connector. For further discussion of emulation of I/O computing components, particular Fibre Channel connection components, reference is made to U.S. patent application Ser. No. 14/133,852 to Jones et al., filed Dec. 19, 2013, entitled "Virtual I/O Hardware" and U.S. patent application Ser. No. 12/215,984 to LeCrone et al., filed Jun. 8, 2008, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may include an Internet connection and/or possibly some other types of connection(s). In an embodiment herein, the connection mechanism 140 may be directly incompatible with a FICON connection. The incompatibility may be hardware incompatibility, software incompatibility, or both. Such connection mechanism 140 may not support a direct FICON connection but, instead, rely on a FICON emulator (and/or other emulator(s)) for providing data in an appropriate format. It is further noted that where FICON emulation is being performed, the data storage device 150 may include or be coupled to a FICON emulator portion that may send and receive data to and from the connection mechanism 140 and also emulates a Fibre Channel FC0 physical layer for the benefit of the data storage device 150. Thus, in such case involving emulation, both the host 110 and the data storage device 150 may operate as if the devices 110, 150 were communicating using a FICON hardware connection.

Figure 4:
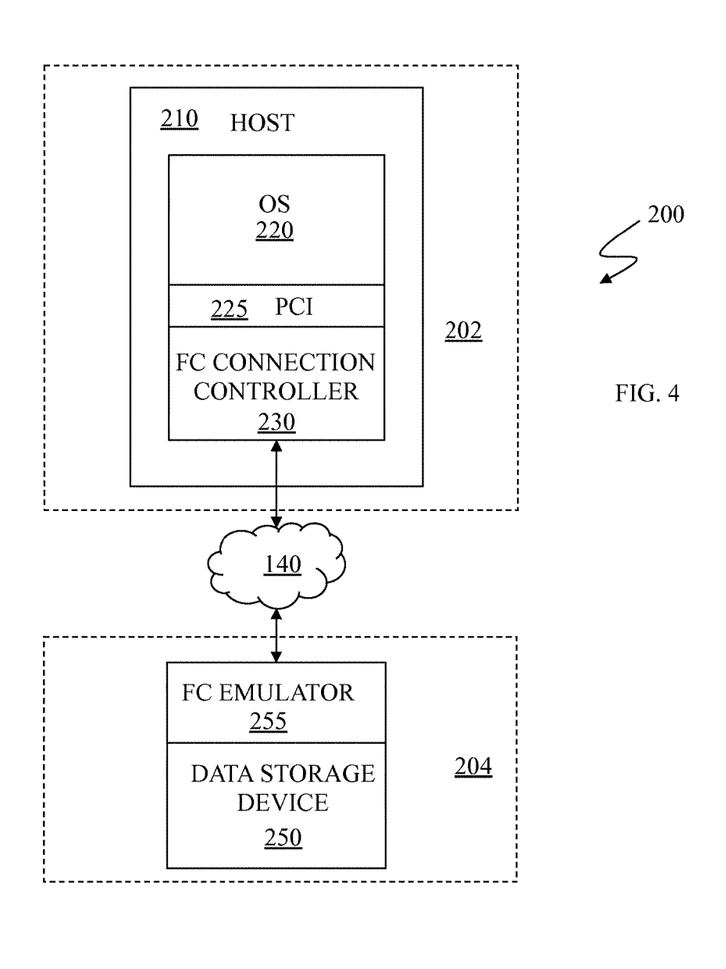
FIG. 4 is a schematic illustration showing a FICON connection between a host and a data storage device operating in a virtualized environment according to an embodiment of the system described herein.

FIG. 4 is a schematic illustration showing an alternative embodiment of a system 200 where a host 210 having an OS 220 and a FICON connection controller 230 providing extended FBA device access is provided in a virtual environment 202. The virtual environment 202 may be provided by using products from VMware or similar products or systems. The host 210 and the FICON connection controller 230 may be a virtualized instances of a host and a FICON controller, respectively, running in the virtual environment 202. The FICON connection controller 230 may thereby include a FICON emulator, as further discussed elsewhere herein.

Similarly, a data storage device 250 may also be provided in a virtual environment 204 that may be implemented using products provided by VMware or similar. The data storage device 250 may have a FICON emulator 255, as further discussed elsewhere herein. The data storage device 250 and the FICON emulator 255 may be virtualized instances of a data storage device and a FICON emulator, respectively, running in the virtual environment 204. Note that the host 210 and the FICON connection controller 230 of the virtual environment 202 may be coupled to an actual data storage device like the data storage device 150 described elsewhere herein. Similarly, the data storage device 250 and the FICON emulator 255 of the virtual environment 204 may be coupled to an actual host, like the host 110 described elsewhere herein. It is noted that use of the FICON emulators in the virtual environments 202, 204 may eliminate a need to provided virtual FICON connectivity. Instead, the host 210 and/or the data storage device 250 may use virtual Ethernet connectivity, which is more likely to be generally available in a virtual environment. The virtual environments 202, 204 may be connected by the connection mechanism 140 discussed elsewhere herein.

Figure 5:
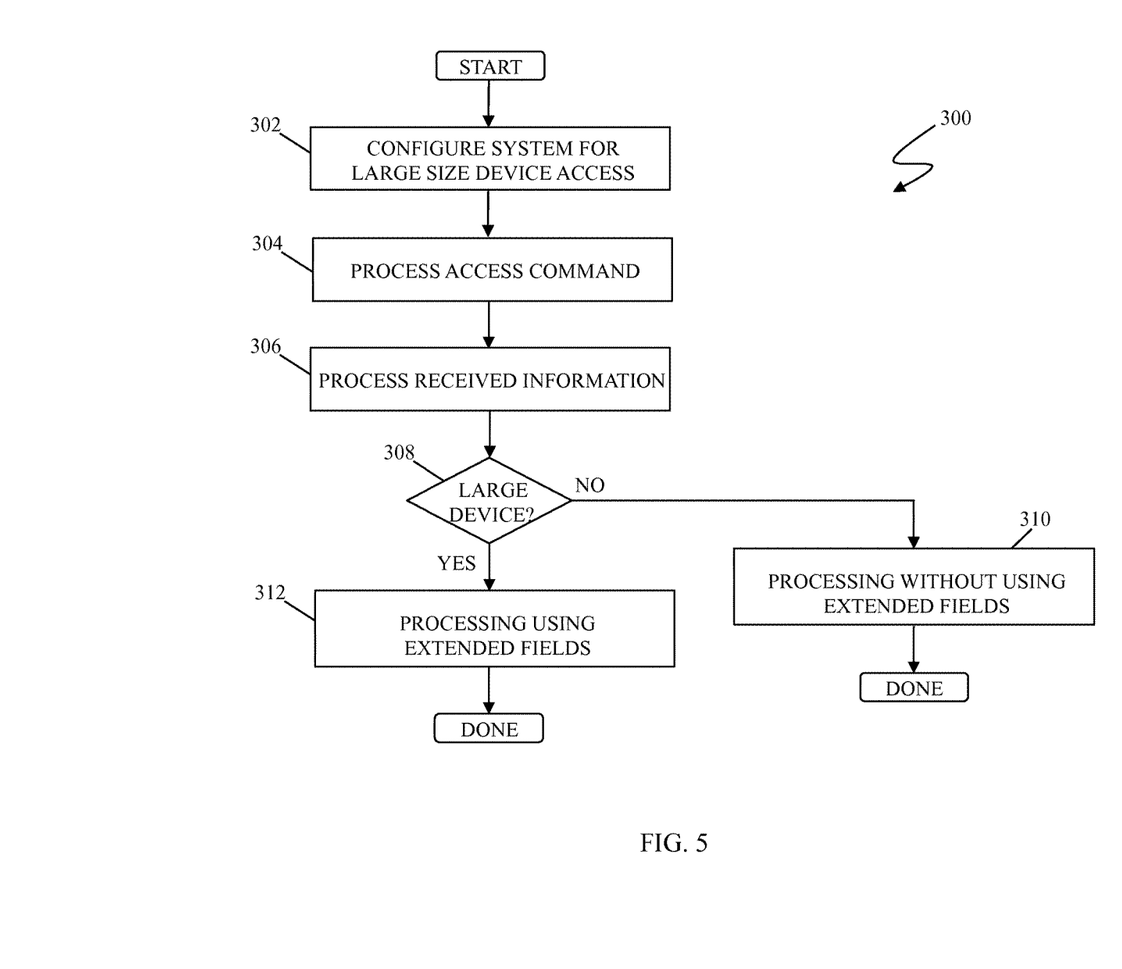
FIG. 5 is a flow diagram showing processing for providing large size FBA device support over a FICON connection according to an embodiment of the system described herein.

FIG. 5 is a flow diagram 300 showing processing for providing large size FBA device support over a FICON connection according to an embodiment of the system described herein. At a step 302, a system is configured for providing access to one or more large size direct access FBA devices, such as FBA devices larger than 2 TB, by a host (e.g., like the host 110 and data storage device 150 discussed elsewhere herein). The configuration may be provided to enable use of existing FBA command sets, such as the existing fixed block command sets for 3370 operation of the FBA device(s). The configurations may include modifications of the controller and/or modifications in connection with the storage device to configure one or more directors of the storage device to provide output to the controller, in response to requests, that is formatted to support large size FBA device access according to the features discussed herein. After the step 302, at a step 304, an access command in connection with an FBA device is processed by the system for access over a FICON connection to the FBA device using the controller. After the step 304, at a step 306, information resulting from processing the command is received. After the step 306, at a test step 308, it is determined whether the FBA device for which access is being requested is larger than 2 TB. In an embodiment, a device larger than 2 TB may be determined by determining whether an extended field of the output from the FBA device is non-zero.

If, at the test step 308, it is determined that the FBA device has a size equal to or smaller than 2 TB, then processing proceeds to a step 310 where access processing without using the extended fields, discussed elsewhere herein, is performed (e.g., I/O read/write requests are performed on the small size FBA device). After the step 310, processing is complete for this iteration of the flow diagram 300. If, at the test step 308, it is determined that the FBA device has a size greater than 2 TB, then processing proceeds to a step 312, where access processing proceeds using extended fields, as further discussed in detail herein (e.g., I/O read/write requests are performed on the large size FBA device). After the step 312, processing is complete for this iteration of the flow diagram 300.

According further to the system described herein, the transport mode protocol for high performance Fibre Channel connections may be used to enhance and extend access to the large FBA devices. The transport mode protocol is an extension to the Fibre-Channel Single-Byte (FC-SB) command set specification supported by the American National Standards Institute (ANSI) (see, e.g., FC-SB-4 and/or FC-SB-5). Transport mode complements and extends the legacy command mode protocol, which is also defined in the FC-SB specification.

In an embodiment, the system described herein may be used with IBM's z high performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol.

zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 6:
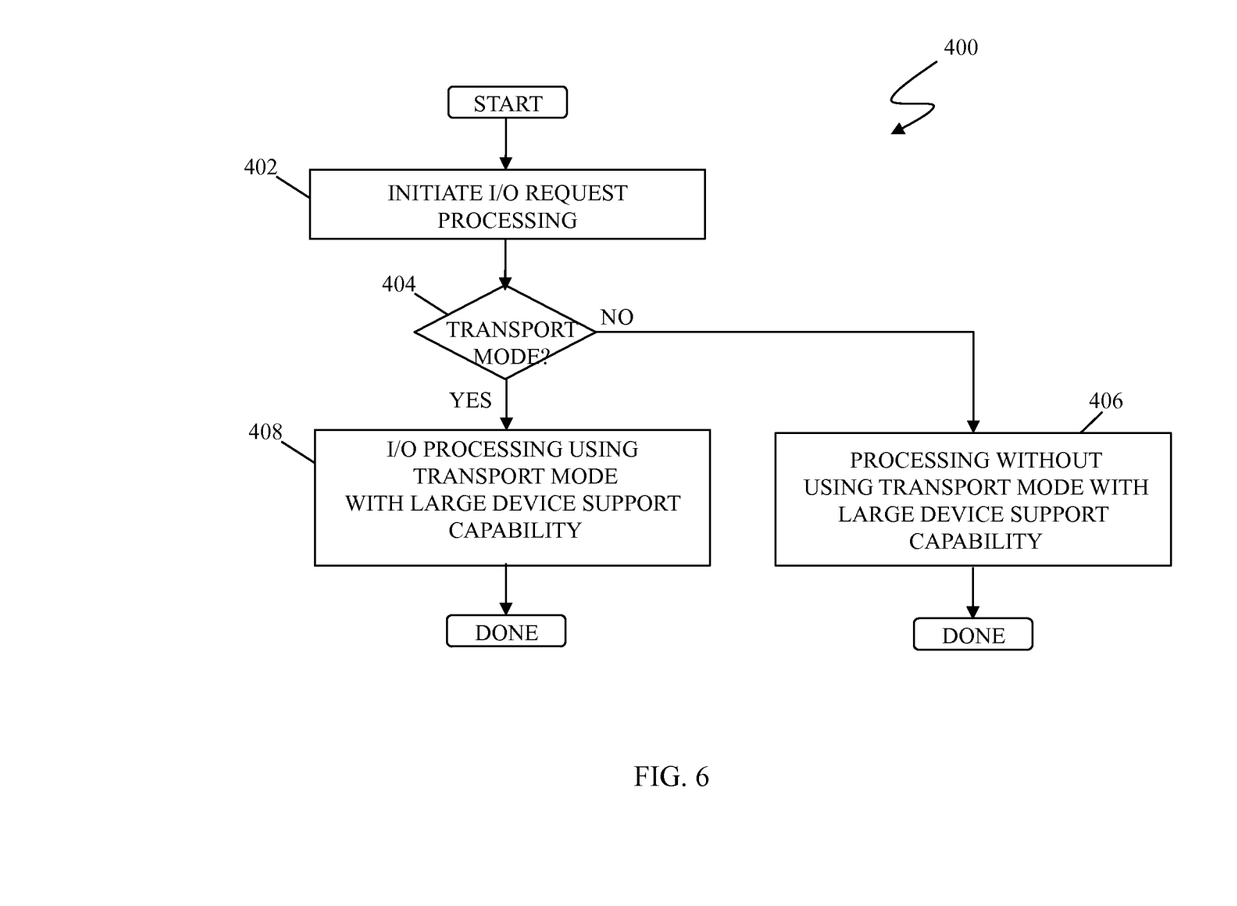
FIG. 6 is a flow diagram showing data access processing involving transport mode protocol, such as zHPF, according to an embodiment of the system described herein.

FIG. 6 is a flow diagram 400 showing data access processing involving the transport mode protocol, such as zHPF, according to an embodiment of the system described herein. At a step 402, an I/O access request is initiated for I/O processing as among a host and data storage device (e.g., like the host 110 and data storage device 150 discussed elsewhere herein). After the step 402, at a test step 404, it is determined whether the transport mode protocol (e.g. zHPF) is activated and/or otherwise operational for the system. If not, then processing proceeds to a step 406, where the I/O processing may proceed using non-transport mode Fibre Channel connection processing and in which the I/O processing may proceed in such manner as that discussed in connection with the flow diagram 300, particularly noting that the processing may proceed with the large FBA device support access features discussed elsewhere herein. After the step 406, processing is complete for this iteration of the flow diagram 400.

If, at the test step 404, it is determined that transport mode protocol (e.g. zHPF) is activated and/or otherwise operational for the system, then processing proceeds to a step 408 where the I/O processing may proceed using the transport mode Fibre Channel connection processing (e.g., zHPF) and in which the I/O processing may proceed in such manner as that discussed in connection with the flow diagram 300, particularly noting that the processing may proceed with the large FBA device support access features discussed elsewhere herein. After the step 408, processing is complete for this iteration of the flow diagram 400.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing storage device access, comprising:
   using a fixed block command set of a fixed block architecture (FBA) to access at least one storage device using a FICON communication channel of a storage system, wherein the at least one storage device has a size larger than 2 terabytes;
   using a reserved field of a define extent command to enable direct access to more than 2 TB of the storage device, wherein the reserved field is used to increase an offset field of a first block of a data extent of the at least one storage device by an amount corresponding to two raised to a power of a number of bits in the reserved field;
   configuring a controller of the communication channel to access the reserved field that provides accessibility to the at least one storage device, having the size larger than 2 terabytes, by sending the define extent command to the controller;
   determining that the at least one storage device has a size larger than 2 terabytes by determining whether the reserved field has a non-zero value;
   determining whether a transport mode protocol is enabled for the storage system; and
   processing access commands for the at least one storage device based on the determination of whether the reserved field has a non-zero value and whether the transport mode protocol is enabled for the storage system,
   wherein at least a portion of the controller emulates a physical layer of a Fibre Channel protocol for a PCI layer.

2. The method according to claim 1, wherein the storage system includes z/Architecture components.

3. The method according to claim 1, wherein the at least one storage device has a size equal to or larger than 64 terabytes.

4. The method according to claim 3, wherein the at least one storage device has a size of between 512 terabytes and 144 petabytes.

5. The method according to claim 1, wherein the fixed block command set provides commands for 3880/3370 operations.

6. The method according to claim 1, wherein the controller and the at least one storage device operate in a virtualized environment.

7. A non-transitory computer-readable medium storing software for providing storage device access, the software comprising:
   executable code that recognizes a fixed block command set of a fixed block architecture (FBA) to access a storage device using a FICON communication channel of a storage system, wherein the storage device has a size larger than 2 terabytes;
   executable code that uses a define extent command to enable direct access to more than 2 TB of the storage device, wherein a reserved field is used to increase an offset field of a first block of a data extent of the at least one storage device by an amount corresponding to two raised to a power of a number of bits in the reserved field;
   executable code that enables a controller of the communication channel to access the reserved field that provides accessibility to the storage device, having the size larger than 2 terabytes, by sending the define extent command to the controller;
   executable code that determines that the at least one storage device has a size larger than 2 terabytes by determining whether the reserved field has a non-zero value;
   executable code that determines whether a transport mode protocol is enabled for the storage system;
   executable code that processes access commands for the at least one storage device based on the determination of whether the reserved field has a non-zero value and whether the transport mode protocol is enabled for the storage system; and
   executable code that enables at least a portion of the controller to emulate a physical layer of a Fibre Channel protocol for a PCI layer.

8. The non-transitory computer-readable medium according to claim 7, wherein the storage system includes z/Architecture components.

9. The non-transitory computer-readable medium according to claim 7, wherein the storage device has a size equal to or larger than 64 terabytes.

10. The non-transitory computer according to claim 9, wherein the storage device has a size of between 512 terabytes and 144 petabytes.

11. The non-transitory computer-readable medium according to claim 7, wherein the fixed block command set provides commands for 3880/3370 operations.

12. The non-transitory computer-readable medium according to claim 7, wherein the controller and the storage device operate in a virtualized environment.

13. A storage system, comprising:
   a host having an operating system and a FICON controller;
   at least one storage device;
   a FICON connection between the host and the at least one storage device; and
   a non-transitory computer-readable medium storing software for providing storage device access, the software comprising:
      executable code that recognizes a fixed block command set of a fixed block architecture (FBA) to access the at least one storage device using a communication channel, wherein the storage device has a size larger than 2 terabytes;
      executable code that uses a define extent command to enable direct access to more than 2 TB of the storage device, wherein a reserved field is used to increase an offset field of a first block of a data extent of the at least one storage device by an amount corresponding to two raised to a power of a number of bits in the reserved field;
      executable code that enables the FICON controller to access the reserved field that provides accessibility to the storage device, having the size larger than 2 terabytes, by sending the define extent command to the controller;
      executable code that determines that the at least one storage device has a size larger than 2 terabytes by determining whether the reserved field has a non-zero value;
      executable code that determines whether a transport mode protocol is enabled for the storage system;
   executable code that processes access commands for the at least one storage device based on the determination of whether the reserved field has a non-zero value and whether the transport mode protocol is enabled for the storage system; and
   executable code that enables at least a portion of the controller to emulate a physical layer of a Fibre Channel protocol for a PCI layer.

14. The system according to claim 13, wherein the storage system includes z/Architecture components.

15. The system according to claim 13, wherein the at least one storage device has a size equal to or larger than 64 terabytes.

16. The system according to claim 15, wherein the at least one storage device has a size of between 512 terabytes and 144 petabytes.

17. The system according to claim 13, wherein the fixed block command set provides commands for 3880/3370 operations.

18. The system according to claim 13, wherein the controller and the storage device operate in a virtualized environment.

* * * * *